(12) United States Patent
Pritschins et al.

(10) Patent No.: US 7,205,351 B2
(45) Date of Patent: Apr. 17, 2007

(54) PROCESSING AIDS FOR THE PROCESSING OF SYNTHETIC POLYMER COMPOSITIONS

(75) Inventors: Wolfgang Pritschins, Wesel (DE); Barbel Gertzen, Emmerich (DE); Andrea Esser, Wesel (DE); Karlheinz Haubennestel, Wesel (DE)

(73) Assignee: BYK-Chemie GmbH, Wesel (DE)

( * ) Notice: Subject to any disclaimer, the term of this patent is extended or adjusted under 35 U.S.C. 154(b) by 294 days.

(21) Appl. No.: 10/274,642

(22) Filed: Oct. 18, 2002

(65) Prior Publication Data

US 2003/0171471 A1    Sep. 11, 2003

(30) Foreign Application Priority Data

Oct. 19, 2001    (DE) ................................ 101 52 716

(51) Int. Cl.
*C08K 5/11*    (2006.01)

(52) U.S. Cl. ........................ 524/311; 524/314; 524/318

(58) Field of Classification Search ................. 560/76, 560/129, 265–266, 89, 91; 524/306, 311, 524/314, 318
See application file for complete search history.

(56) References Cited

U.S. PATENT DOCUMENTS

| | | | |
|---|---|---|---|
| 3,736,289 A | 5/1973 | Marshall et al. | |
| 3,857,865 A | 12/1974 | Sturwold et al. | |
| 3,875,069 A * | 4/1975 | Worschech et al. | 508/482 |
| 4,172,059 A | 10/1979 | Atkins et al. | |
| 4,192,930 A | 3/1980 | Beck et al. | |
| 4,210,571 A | 7/1980 | Herman | |
| 4,210,572 A | 7/1980 | Herman et al. | |
| 4,622,354 A | 11/1986 | Iseler et al. | |
| 4,632,770 A | 12/1986 | Slanker | |
| 4,661,163 A | 4/1987 | Berke et al. | |
| 4,868,224 A | 9/1989 | Harasin et al. | |
| 5,158,697 A * | 10/1992 | Kawamori et al. | 252/60 |
| 5,416,167 A | 5/1995 | Thoermer et al. | |
| 5,500,176 A | 3/1996 | Parks et al. | |
| 5,670,553 A | 9/1997 | Mackey | |
| 5,688,750 A * | 11/1997 | Cooban et al. | 508/497 |
| 5,707,945 A | 1/1998 | Cooban et al. | |

FOREIGN PATENT DOCUMENTS

| | | |
|---|---|---|
| DE | 3650587 | 5/1987 |
| EP | 022977 | 12/1984 |
| EP | 0551818 | 7/1993 |
| EP | 0926173 | 6/1999 |
| FR | 2502162 | 9/1982 |
| GB | 1471313 | 4/1977 |

OTHER PUBLICATIONS

"European Search Report for 02021519.0-1253, mailed Jan. 17, 2003", 6 pgs.
Batzer, Hans, "Polymere Werkstoffe - Band III, Technologie 2 [Polymeric materials, vol. III, Technology 2]", *Georg Thieme Verlag, Stuttgart*, (1984),224-226, 235-236, 244-245, 251-256.
Batzer, Hans, "Polymere Werkstoffe, Band II - Technologie 1 (Polymeric materials, vol. II - Technology 1)", *Georg Thieme Verlag*, Stuttgart, (1984),p. 328 et seq.
Hagrman, Pamela J., "Organisch-anorganische Hybidmaterialien: von einfachen Koordinationspolymeren zu Molybdanoxiden mit Organodiamin-Templaten", *Angewandte Chemie*, 111(18), (Sep. 17, 1999),2798-2848.
Riedel, Tomas, "Gleitmittel und verwandte Hilfsstoffe", *Kunstsoffe-Additive [Plastics additives], 3. Ausgabe [3rd edition]*, Carl Hanser-Verlag, (1989),441-502.

* cited by examiner

*Primary Examiner*—Peter Szekely
(74) *Attorney, Agent, or Firm*—Schwegman, Lundberg, Woessner and Kluth P.A.

(57) ABSTRACT

The present invention relates to processing aids for the processing of synthetic polymer compositions based on carboxylic esters, where the processing aids include, partial esters which contain at least 18 carbon atoms, have a number-average molecular weight of from 300 to 10,000, and can be prepared by the reaction of saturated or unsaturated aliphatic and/or cycloaliphatic polycarboxylic acids or anhydrides of these with saturated or unsaturated aliphatic, cycloaliphatic and/or aromatic monoepoxides and/or monoalcohols optionally containing ether groups, where at least 10% and not more than 90% of the carboxyl groups of the polycarboxylic acids have been reacted and the polycarboxylic acids and anhydrides of these contain from 8 to 100 carbon atoms. The invention further relates to the use of these processing aids in synthetic polymer compositions, and also to synthetic polymer compositions, which comprise these processing aids.

15 Claims, No Drawings

PROCESSING AIDS FOR THE PROCESSING OF SYNTHETIC POLYMER COMPOSITIONS

CROSS-REFERENCE TO RELATED APPLICATION

This application claims priority from German patent application No. DE 101 52 716.0, Filed: Oct. 19, 2001, which is incorporated herein by reference.

FIELD OF THE INVENTION

The present invention relates to processing aids for the processing of synthetic polymer compositions based on carboxylic esters, for improving surface quality, such as smoothness and gloss, surface-coatability, and the homogeneity of pigmented and/or filled synthetic polymer compositions. Along with these properties, the processing aids of the invention have a stabilizing effect on mixtures of incompatible polymers, and improve the flow properties of synthetic polymer compositions.

BACKGROUND OF THE INVENTION

Processing aids (process auxiliaries) are needed only in relatively small amounts, but are important additives without which some synthetic polymers would be difficult to process and certain shaping processes would be impossible to carry out. They are used with most thermoplastic synthetic polymers and thermoset polymers (curable moulding compositions), and have a decisive role in raising the output performance of production machinery, improving the quality of finished products, and permitting the use of new processing technologies.

Processing aids are used to improve flow behaviour and flowability of synthetic polymers, to improve homogeneity and stability of filled and unfilled synthetic polymer mixtures and synthetic polymer melts, to improve surface quality, and to reduce the adhesion of the melts or mixtures to machinery components, and for the resultant improvement in mould-release properties.

The requirements for suitable processing aids when used together with synthetic polymers are generally the following:

There must be no impairment of the underlying physical properties of the polymers, but there has to be the desired effect on the application-related properties of the finished components. Examples of these properties are surface smoothness, gloss, transparency, printability, weldability, tack, and also slip behaviour and blocking behaviour.

There must be no increase in the adhesion of synthetic polymer compositions and synthetic polymer melts to machinery components or tooling components, or in the resultant decomposition of the polymer. It is desirable that processing aids have anti-adhesive properties.

It should be possible to optimise the rheological behaviour of the synthetic polymers—from powder feed through to melt—and of the compounded synthetic polymer material, in order to obtain homogeneous plasticized synthetic polymer melts and/or homogeneous compounded synthetic polymer materials.

An example of an overview of processing aids and their possible applications is found in Hans Batzer, Polymere Werkstoffe, Band II—Technologie 1 [Polymeric materials, volume II—Technology 1], Georg Thieme Verlag Stuttgart, 1984, pp. 328 et seq., and Gächter/Müller, Kunststoff-Additive [Plastics additives], 3rd edition, Carl Hanser-Verlag, 1989, pp. 441–502.

TABLE 1

Processing aids and their uses:

| Class of Compound | Uses |
| --- | --- |
| Hydrocarbons, e.g., paraffin oil - polyethylene waxes | Lubricants and release agents for unplasticized and plasticized PVC, PS, PA and UP 0.1–1.0%, e.g.,: higher surface gloss, e.g., in PE Amount used up to 5% |
| Alcohols, e.g., palmityl, stearyl, tallow fatty alcohol | Extrusion, injection moulding, calander - of unplasticized and plasticized PVC (Amount: 0.5–1.0%) Improvement in flowability, internal lubricant action, good compatibility, transparency |
| Ketones, e.g., stearone | Blown PO films as slip agent, reduced adhesion of films to machinery rollers |
| Carboxylic acids, e.g., stearic acids, oxidized polyethylene waxes | Processing of unplasticized and plasticized PVC, PS, CA, MF, and compounded rubber materials |
| Metal salts of carboxylic acids, e.g., Ca, Zn stearates | Processing of plasticized PVC, PO, PS, ABS, PF and MF. A different lubricant action depending on type, effect on melting behaviour of PVC, often used as costabilizers |
| Carboxamides, e.g., fatty acid monoamides, fatty acid diamides | Slip agents; antiblocking agent for PO Lubricant, slip agent in PVC, PS, PO processing |
| Carboxylic esters, e.g., fatty acid esters, esters of polycarboxylic acids | Lubricant for unplasticized and plasticized PVC, PS, PA and MF, processing aid for extrusion, calandering, blow moulding and vacuum moulding of PVC |

The abbreviations used herein, e.g., in the table above have the following meanings:

PVC=Polyvinyl chloride
PS=Polystyrene
CA=Cellulose acetate
MF=Melamine-formaldehyde resin
PO=Polyolefin
ABS=Acrylonitrile-butadiene-styrene copolymer
PF=Phenol-formaldehyde resin
PA=Polyamide
UP=Unsaturated polyester resin
PE=Polyethylene Although a wide variety of processing aids are known, problems continue to arise in the use of these substances in synthetic polymer compositions. For example, it is known that some processing aids migrate at room temperature to the surface of finished components and thus impair their appearance, or lead to the release of undesired residues (emissions) due to their volatility. For example, stearic acid can deposit on the surface of plasticized PVC as an undesired white deposit (blooming).

Refined hydrocarbons, which are used as lubricants in the production of impact-modified PVC, can also leave a residue (deposit) on the polymer surface at room temperature and give the synthetic polymer a greasy and dull appearance. When metal salts are used, e.g., zinc stearate, particularly in hot-curing synthetic polymer compositions, problems arise since there can be residues (emissions) on the finished parts due to the metal salts. These metal salts also cause adhesion problems when the finished parts are painted. These adhesion problems necessitate the use of additional steps, e.g., alkali treatment (power wash), to improve surface-coatability of the finished component. This additional operation is undesired and is also hazardous to the environment.

Other problems (effects) can arise between processing aids and certain components. For example, exceeding the solubility limit of the processing aid in the polymer can lead to "plate-out" when using certain dyes, pigments, stabilizers and fillers. Often, this phenomenon (plate-out) occurs when short-chain fatty esters are used.

Use of processing aids in polyolefin thermoplastics can result in undesirable interactions with light stabilizers, other stabilizers and/or antioxidants. This may result in disruption of the processing in the machinery and/or loss of stability in the finished products.

U.S. Pat. Nos. 4,210,571 and 4,210,572 disclose coupling agents for the treatment of fillers for hot-curing resins based on carboxylic ester derivatives of mono-, di- and trihydroxy fatty acid esters of mono- or polyhydric alcohols having from 1 to 4 carbon atoms, and use of these. These coupling agents create adhesion between the filler and the resin.

European Patent Application No. 0 22 977 B1 (EP '977) (corresponding to German Patent No. DE 36 50 587 T2, U.S. Pat. No. 4,622,354) discloses the preparation of a curable, phase-stabilized polyester moulding composition.

A problem with many curable moulding compositions, e.g., with polyester resins, is that the individual constituents of the polyester resin are mutually immiscible. Therefore, during processing the components tend to separate into individual phases (phase separation). According EP '977, the use of fatty acids having from 5 to 28 carbon atoms reduces the tendency towards phase separation. A disadvantage here is that the fatty acids disclosed can react with the MgO additive and prevent the additive from performing its function (adjustment of final processing viscosity).

U.S. Pat. No. 4,172,059 discloses a curable moulding composition prepared from an unsaturated polyester resin or from a terminally unsaturated vinyl ester resin, and also discloses mixtures of the two components with an olefinically unsaturated copolymerizable monomer, a thickener, and a filler, and at least 0.4% by weight of a viscosity-lowering processing aid. The specification discloses that the viscosity-lowering processing aid is an aliphatic monocarboxylic acid having at least 6 carbon atoms in the chain. Again, a disadvantage of this system is that the monocarboxylic acids disclosed can react with the additive (MgO).

Although there are a wide variety of processing aids on the market, there are no substances which favourably affect the surface quality of synthetic polymer compositions, advantageously affect the flow properties of synthetic polymer compositions (both during preparation and during processing), and also improve parameters such as surface-coatability and homogeneity. Thus, one aspect of the invention is to identify processing aids that do not exhibit the weaknesses listed.

Another aspect of the invention is to identify processing aids that fulfil the stringent environmental requirements such as, having minimum migration tendency and emission tendency. Thus, there is a need for processing aids that have low migration and or release of undesired residues (emissions) due to their volatility (fogging, blooming, etc) in the final application (products).

Surprisingly, the objects were achieved by using partial esters of carboxylic acids.

SUMMARY OF THE INVENTION

Therefore, the present invention provides processing aids, for the processing of synthetic polymer compositions, based on carboxylic esters, whsrein they are composed of, or include, partial esters which contain at least 18 carbon atoms, have a number-average molecular weight of from 300 to 10,000, and can be prepared by the reaction of saturated or unsaturated aliphatic and/or cycloaliphatic polycarboxylic acids or anhydrides thereof with saturated or unsaturated aliphatic, cycloaliphatic and/or aromatic monoepoxides and/or monoalcohols optionally containing ether groups, where at least 10% and not more than 90% of the carboxyl groups of the polycarboxylic acids have been reacted and the polycarboxylic acids and anhydrides of these contain from 8 to 100 carbon atoms.

It is preferable that from 20 to 70%, and more preferable that from 25–60%, of the carboxyl groups of the polycarboxylic acids have been esterified.

The polycarboxylic acids which are preferred in practicing the present invention have from 2 to 4 carboxylic acid groups. More preferred polycarboxylic acids are dimer or trimer acids having from 30 to 60 carbon atoms. These acids can be obtained by polymerization of unsaturated fatty acids.

The acid value of the partial esters is preferably at least 10 mg KOH/g.

The invention also provides a method for using the partial esters (processing aids) of the invention as a replacement for internal and/or external lubricants when processing synthetic polymer compositions.

DETAILED DESCRIPTION OF THE INVENTION

The processing aids (partial esters) of the invention can be used either in thermoplastic synthetic polymer compositions or in thermoset synthetic polymer compositions, such as those disclosed in DIN 7724.

The processing aids of the invention can be used with many thermoplastic synthetic polymer compositions, which include polyolefins, such as, for example, polypropylene, polyethylene and the like; ethylene-vinyl acetate copolymers, polyamides, polycarbonates, polystyrenes, polyethylene terephthalates, polyesters, poly(meth)acrylates, or mixtures thereof.

A particularly preferred use of the partial esters (processing aids) is in PVC, in particular soft PVC and paste PVC.

In thermoset synthetic polymer compositions, one preferred use of the partial esters is use in curable (meth)acrylate resins and mixtures of these. Preferred (meth)acrylate resins in this context are polymer compositions which are produced by bulk polymerization during the casting procedure. Prepolymerization takes place first here up to conversion of from 10 to 30% of polymer, at the boiling point of the monomer. The resultant syrup (PMMA is soluble in the monomer) is then polymerized in cells with movable cell walls, in a water bath (cell-casting process).

Another preferred use is use of the partial esters in polyurethane systems (PU systems). Among the various structural types of PU, it is the crosslinked polyether polyurethanes and crosslinked polyester polyurethanes which are relevant here.

A particularly preferred field of use of the partial esters is with unsaturated polyester resin systems (UP). These are solutions of unsaturated polyesters in a vinyl monomer, mostly styrene. They are cured by crosslinking copolymerization of the vinyl monomer with the polymerizable double bonds of the polyester. Accelerated resins have the accelerator required for cold curing previously added.

Particularly preferred applications of the partial esters in UPs are UP moulding compositions, in particular SMC, BMC, DMC, TMC, LDMC.

The term SMC refers to fibre-reinforced moulding compounds in sheet form (Sheet Moulding Compounds).

The term BMC refers to dry, indeed in part flowable, pellets (Bulk Moulding Compounds).

The term DMC refers to dough-like moulding compounds (Dough Moulding Compounds).

The term TMC refers to thickened moulding compounds (Thick Moulding Compounds).

The term LDMC refers to fibre-reinforced moulding compounds of low density (Low Density Moulding Compounds).

In the case of SMC moulding compounds, the partial esters of the invention may be used either in LS (Low Shrink) or LP (Low Profile) systems.

LP systems are compounded materials that provide substantial compensation of shrinkage. LS systems do not achieve the shrinkage compensation of LP resins, but are substantially easier to colour.

The polymer compositions can be processed by injection moulding, compression moulding, blow moulding (extrusion blow moulding, or injection blow moulding), extrusion, coating/spreading, casting, calandering (rolled melt processes), impregnation, pultrusion or foaming.

In processing the abovementioned synthetic polymer compositions, use may be made of fillers and/or reinforcing agents, e.g., chalk ($CaCO_3$)—natural or synthetic, alumina trihydrate (ATH), kaolin, talc, feldspar, metal oxides, powdered quartz, rock flour, wollastonite, mica, glass fibres, glass beads; synthetic organic substances (e.g., synthetic fibres, polyesters, polyamides, aramids), carbon fibres (C fibres); naturally occurring organic substances (e.g., wood flour, cellulose).

The invention also provides synthetic polymer compositions, which include from 0.05 to 10% by weight of the processing aids of the invention, and can also include, where appropriate, the abovementioned fillers and auxiliaries.

Various thermoplastic synthetic polymer compositions of the invention will first be described by way of example below, followed by various thermoset synthetic polymer compositions of the invention.

Calandering Compositions (Synthetic Polymer Compositions for Calandering)

Thermoplastics which have a distinct plastic region with high melt viscosity (about $10^2$–$10^3$ Pa·s) can be processed by calandering. Examples of processes for this purpose are described in Polymere Werkstoffe—Band III, Technologie 2 [Polymeric materials, Volume III, Technology 2], by Hans Batzer, Georg Thieme Verlag, Stuttgart, 1984 edition, pp. 251 et seq. Examples of products produced in this way include floor coverings, films with a very wide variety of uses made from unplasticized, semirigid, plasticized PVC and the like.

In order to prevent the melt from adhering to the metal surfaces, internal lubricants are often added, e.g., fatty alcohol esters of long-chain fatty acids ($C_{14}$–$C_{18}$). The lubricants improve melt flow by reducing the friction between the PVC particles. External lubricants, e.g., paraffins and waxes, are also added in order to ease separation of the calandering composition from the rolls. Downstream of the calander there is often printing machinery or embossing calanders (e.g., to produce decorative films, upholstery films or synthetic-leather films from plasticized PVC). This further processing makes it advisable to replace the internal and/or external lubricants used hitherto by the partial ester of the invention, in order thereby to utilize the advantages of better surface-coatability or printability.

The internal and/or external lubricants are replaced by the processing aid of the invention during the mixing or dispersion process.

Injection-Moulding Compositions

Moulding compositions made from thermoplastic synthetic polymers are usually referred to as injection-moulding compositions. The moulding compositions are composed of a polymeric base material and of additives, e.g., fillers or reinforcing materials. Injection-moulding compositions often use polymers with lower molar masses than those used in extrusion compositions. Therefore, they have more favourable melt viscosity and flowability. However, when additives are used, e.g., flow promoters and lubricants, the action of these materials always has to be taken into account. For example, any reduction in the relative molar mass of the polymer impairs mechanical properties. In addition, lubricant additives can also lower the softening point.

Further detailed descriptions of additives in injection-moulding compositions, and the processing and composition of these, are found in Polymere Werkstoffe—Band III, Technologie 2 [Polymeric materials, Volume III, Technology 2], by Hans Batzer, Georg Thieme Verlag, Stuttgart, 1984 edition, pp. 204–221. Here again, it has proven to be advisable, particularly in the processing of unplasticized PVC, to use the partial esters of the invention to replace the internal and/or external lubricants used hitherto, in order thereby to utilize the advantages of better surface-coatability or printability.

To this end, the internal and/or external lubricants are simply replaced by the processing aids of the invention during the mixing or dispersion process. Here again, improved surface quality is apparent with respect to smoothness and gloss, as is an additional effect in homogenisation during the colouring process. This effect is particularly advantageous for uses where surface-coating is not intended.

Extrusion Compositions

Extrusion compositions often use polymers with higher molar masses than those used for injection-moulding compositions, e.g., with higher melt viscosity and lower flowability. The higher melt viscosity of the extrusion compositions improves strength between discharge from the die and the calibrator. The higher relative molar mass and therefore higher melt viscosity is also associated with better mechanical properties, but with greater difficulty in processing by injection moulding. A detailed description is found in Polymere Werkstoffe—Band III, Technologie 2 [Polymeric materials, Volume III, Technology 2], by Hans Batzer, Georg Thieme Verlag, Stuttgart, 1984 edition, pp. 244 et seq.

Here again, it has proven advisable, especially when processing PVC profiles and PVC for outdoor use, to use the partial esters of the invention to replace the internal and/or external lubricants used hitherto, in order thereby to utilize the advantages of better surface-coatability or printability.

To this end, the internal and/or external lubricants are simply replaced by the processing aid of the invention during the mixing or dispersion process. Here again, better surface quality with respect to smoothness and gloss is apparent, as is an additional effect in homogenization during the colouring process. This effect is particularly advantageous for uses where no surface-coating is intended.

The Examples herein are polymer compositions useful for preparing window profiles. The general composition is as follows:
PVC, additives to increase impact strength, stabilizers, phosphite, epoxidized soya oil, 12-hydroxystearic acid, stearyl stearate, antioxidant, titanium dioxide, fillers (e.g., $CaCO_3$).

Coating Compositions

According to DIN 8580, coating is a manufacturing process for applying an adherent layer made from a shapeless substance to a workpiece or substrate web.

The coating compositions usually are thermoplastics or—to a small extent—elastomers. Among the thermoplastics, PVC pastes are the most common. Among PVC pastes, a distinction is made between plastisols, which are more commonly used, and organosols.

Coating compositions are prepared by stirring pulverulent PVC paste grades (usually based on emulsion PVC, and occasionally on suspension PVC) and additives (stabilizers), pigments and fillers into plasticizers, by mixing or dispersion in appropriate mixing apparatus.

A detailed description of the preparation process is found in Polymere Werkstoffe—Band III, Technologie 2 [Polymeric materials, Volume III, Technology 2], by Hans Batzer, Georg Thieme Verlag, Stuttgart, 1984 edition, pp. 254 et seq.

The floor coverings and synthetic leather coatings produced are often further processed with an additional surface treatment, e.g., embossing of a particular design, with the aid of embossing rolls, and/or surface-coating by planography or gravure printing.

This additional processing, e.g., surface treatment, makes it advisable to replace the internal and/or external lubricants used hitherto with the partial esters (processing aids) of the invention, in order take advantage of the improvement in the surface-coatability or printability. To this end, the internal and/or external lubricants are simply replaced by the processing aid of the invention during the mixing or dispersion process.

Here again, better surface quality with respect to smoothness and gloss is apparent, as is an additional effect in homogenization during the colouring process using pigments. This effect is particularly advantageous for uses where no surface coating is intended.

When embossing papers (e.g., imitation leathers) are used in the transfer process, it has proven advantageous to use the partial ester of the invention since there is a marked increase in the usage cycle of these embossing papers, which are mostly very expensive.

Various inventive and comparative formulations from the field of plastisol formulations for plasticized PVC are listed in the Examples section under Application examples—Application Example 1.

Thermosets (Moulding Compounds)

Moulding compounds generally include the following components:
reactive resins, curing agents, optionaly accelerators (this mixture often also being termed binder matrix) fillers and/or reinforcing materials, lubricants and release agents, pigments and/or dyes, other additives, e.g., stabilizers, flexibilizers, curing retarders and non-reactive resins.

The fillers usually used are chalk ($CaCO_3$), ATH, powdered quartz, rock flour, wollastonite, mica, and the reinforcing materials usually used are glass fibres, synthetic organic substances (e.g., synthetic fibres, polyesters, polyamides, aramids), carbon fibres (C fibres); naturally occurring organic substances (e.g., wood flour and cellulose).

Details of the processing of these moulding compounds are given in Polymere Werkstoffe—Band III, Technologie 2 [Polymeric materials, Volume III, Technology 2], by Hans Batzer, Georg Thieme Verlag, Stuttgart, 1984 edition, pp. 224 et seq.

Examples of thermoset compositions are UP moulding compositions, in particular fibre-reinforced moulding compounds, as described in Polymere Werkstoffe—Band III, Technologie 2 [Polymeric materials, Volume III, Technology 2], by Hans Batzer, Georg Thieme Verlag, Stuttgart, 1984 edition, pp. 235 et seq. These fibre-reinforced moulding compounds are often found in sheet form (also termed Sheet Moulding Compounds or SMC) further divide into the groups LS (Low Shrink) and LP (Low Profile). LP systems are compounds that give substantial compensation of shrinkage. LS systems do not achieve the shrinkage compensation of LP resins but are substantially easier to colour. If SMC mouldings are intended for downstream surface-coating, e.g., in the case of bodywork components, preference is given to LP systems. Here again, the additional processing has made it advisable to use the processing aids of the invention to replace the internal and/or external lubricants used hitherto, in order thereby to utilize the advantages of better surface-coatability or printability.

To this end, the internal and/or external lubricants are simply replaced by the processing aid of the invention during the mixing or dispersion process. Better stabilization of the compounds is also apparent, without any impairment of the shrinkage effect attributed to the LS and LP components. Here again, the improved surface quality, with respect to smoothness and gloss is apparent, as is an additional effect in homogenization during the colouring process. This effect is particularly advantageous for uses where no surface coating is intended.

Various inventive and comparative formulations from the field of thermosets and SMC manufacture are listed in the Examples section under the heading Application examples—Application Example 2 and Application Example 3.

In order to illustrate the invention, the Examples section below demonstrates the preparation of various inventive and comparative processing aids and their suitability for applications.

EXAMPLES

Preparation Examples

General preparation specification relating to the preparation examples listed in Table I, below.

Components 1 and 2 are weighed, in the ratio given, into a suitable reaction vessel, and heated under nitrogen gas to about 80° C., with stirring. Component 3 is added, and the mixture is then heated to the temperature given under nitrogen gas. Any water of reaction produced is separated via a water separator. The progress of the reaction is monitored by determining the acid value. Stirring is continued at the temperature given until the acid value given has been achieved. The mixture is then cooled and discharged. The following substances, inter alia, were used:

Pripol 1022 is a C-36 dimer acid from Unichema
Pripol 1009 is a hydrogenated C36 dimer acid from Unichema
Pripol 1040 is a C-54 trimer acid from Unichema
The MA/fatty acid adduct from Example 17 is the product of an addition reaction of 1 mol of maleic anhydride onto a conjugated unsaturated C-18 fatty acid mixture
MPEG 350 is a methoxypolyethylene glycol with an average molar mass of 350 g/mol
MPEG 500 is a methoxypolyethylene glycol with an average molar mass of 500 g/mol
MPEG 750 is a methoxypolyethylene glycol with an average molar mass of 750 g/mol
Polyglycol B11/50 is a butanol-started EO/PO polyether (EO:PO=1:1) with an average molar mass of 1 020 g/mol
Lutensol ON 50 is an oxo-alcohol-started EO polyether with an average molar mass of 400 g/mol

APPLICATION EXAMPLES

Application Example 1

The plastisol compositions given in Table II below were prepared by homogenizing the constituents in the usual way in a mixer.

TABLE II

PLASTISOL FORMULATION FOR PLASTICIZED PVC

| | Application example | | | |
|---|---|---|---|---|
| | 1a* | 1b* | 1c | 1d* |
| DINP (Diisodecylphthalate) | 275 | 275 | 275 | 275 |
| Butyltin mercaptide, (Tinstab BTS 61 from Akzo Nobel) | 2.5 | 2.5 | 2.5 | 2.5 |
| Stabilizer preparation based on calcium/zinc carboxylate (Lankromark LZC 184 from Akzo Nobel) | 5 | 5 | 5 | 5 |
| TiO$_2$, rutile type (Kronos 2300 from Kronos) | 100 | 100 | 100 | 100 |

TABLE I

Preparation Examples

| Example | Component 1 | Proportion by weight K1 | Reacted acid groups in % | Component 2 | Proportion by weight K2 | Component 3 | Proportion by weight K3 | Reaction temp. [° C.] | Acid value [mg KOH/g] |
|---|---|---|---|---|---|---|---|---|---|
| 1 | Pripol 1022 | 89.4 | 45 | Butanol | 10.1 | p-Toluenesulphonic acid | 0.5 | 190 | 94 |
| 2 | Pripol 1022 | 72.3 | 40 | Oleyl alcohol | 26.7 | Dodecylbenzenesulphonic acid | 1 | 150 | 85 |
| 3 | Pripol 1022 | 74.7 | 35 | Stearyl alcohol | 24.3 | Dodecylbenzenesulphonic acid | 1 | 150 | 94 |
| 4 | Pripol 1022 | 72.7 | 30 | MPEG 350 | 26.3 | Dodecylbenzenesulphonic acid | 1 | 180 | 99 |
| 5 | Pripol 1022 | 82.5 | 15 | Lutensol ON 50 | 17 | p-Toluenesulphonic acid | 0.5 | 180 | 136 |
| 6 | Pripol 1022 | 91.4 | 20 | 2-Ethylhexanol | 8.1 | p-Toluenesulphonic acid | 0.5 | 140 | 142 |
| 7 | Pripol 1022 | 81 | 50 | 2-Ethylhexanol | 18.5 | p-Toluenesulphonic acid | 0.5 | 140 | 78 |
| 8 | Pripol 1022 | 73.3 | 80 | 2-Ethylhexanol | 26.2 | p-Toluenesulphonic acid | 0.5 | 140 | 28 |
| 9* | Pripol 1022 | 68.7 | 100 | 2-Ethylhexanol | 30.8 | p-Toluenesulphonic acid | 0.5 | 140 | 0 |
| 10 | Pripol 1009 | 84.8 | 50 | Hexenol | 14.7 | p-Toluenesulphonic acid | 0.5 | 140 | 83 |
| 11 | Pripol 1009 | 47.8 | 30 | Polyglycol B11/50 | 51.2 | Tetraisopropyl orthotitanate | 1 | 180 | 66 |
| 12 | Pripol 1040 | 74.9 | 25 | Lutensol ON 50 | 24.4 | p-Toluenesulphonic acid | 0.7 | 180 | 104 |
| 13 | Tetrapropenyl-succinic anhydride | 49.9 | 50 | Oleyl alcohol | 49.9 | p-Toluenesulphonic acid | 0.2 | 120 | 105 |
| 14 | Pripol 1009 | 73.8 | 20 | MPEG 500 | 25.7 | p-Toluenesulphonic acid | 0.5 | 180 | 116 |
| 15 | Pripol 1040 | 62.3 | 90 | Isotridecyl alcohol | 37.2 | p-Toluenesulphonic acid | 0.5 | 170 | 12 |
| 16 | Pripol 1040 | 79.8 | 10 | MPEG 750 | 19.5 | p-Toluenesulphonic acid | 0.7 | 180 | 133 |
| 17 | MA/fatty acid adduct | 52.8 | 50 | Oleyl alcohol | 46.2 | Dodecylbenzenesulphonic acid | 1 | 170 | 97 |
| 18 | Phthalic acid | 54.9 | 25 | Stearyl alcohol | 44.6 | Potassium carbonate | 0.5 | 160 | 280 |
| 19 | Trimellitic anhydride | 44 | 30 | Oleyl alcohol | 55.3 | Potassium carbonate | 0.7 | 150 | 272 |
| 20 | Pripol 1022 | 75.4 | 50 | Ethylhexyl glycidyl ether | 24.1 | p-Toluenesulphonic acid | 0.5 | 160 | 73 |

*non-inventive comparative example

TABLE II-continued

PLASTISOL FORMULATION FOR PLASTICIZED PVC

|  | Application example | | | |
|---|---|---|---|---|
|  | 1a* | 1b* | 1c | 1d* |
| Calcium carbonate (Calcilit 8G from Alpha Calcit) | 285 | 285 | 285 | 285 |
| Alkylphenol ethoxylate (Lankroplast V2023 from Akzo Nobel) | 7.5 | 7.5 | 7.5 | 7.5 |
| Isoparaffin fraction, bp 186–204° C. (Isopar J from ExxonMobil) | 50 | 50 | 50 | 50 |
| Microsuspension PVC, K value 71 (Evipol MP 7151 from European Vinyl Corp.) | 500 | 500 | 500 | 500 |
| C36 dimer acid* (Pripol 1022 from Unichema) |  | 5 |  |  |
| Preparation Example 7 |  |  | 5 |  |
| Preparation Example 9* |  |  |  | 5 |
| Results: |  |  |  |  |
| Surface tension [1] [mN/m] | 44.5 | 46.0 | 52.1 | 44.5 |
| Demouldability [2] | very bad | good | very good | very bad |
| Yellowing | none | marked | slight | none |

Amounts given in parts by weight
*Comparative examples

Since wettability and adhesion during surface-coating are substantially dependent on the polarity of the substrate, the surface tension of formulations 1a–1d was determined.

[1]: To measure surface tension, the plastisols were fully gelled in a Mathis oven, using 200 μm wet layer thickness, at 200° C. for 2 minutes. During this process, the non-inventive formulation 1b prepared using the unesterified dimer acid exhibited marked yellowing due to high carboxy group content, in contrast to the other specimens. Surface tension was measured using a Krüss G2 surface-tension tester. The reference/test liquids used here were water, glycerol, ethylene glycol, 1-octanol and n-dodecane.

Easily the highest surface tension and therefore best surface-coatability was found for inventive formulation 1c. In contrast to this, comparative formulations 1b and 1d using unesterified or fully esterified dicarboxylic acid showed no increase in surface tension or only a slight increase.

[2]: To test demouldability, the plastisols were spread on a gradient-oven steel sheet at a wet-layer thickness of 1 000 μm. A Shuller SH60/21 glass nonwoven was laid into the material. The nonwoven was impressed by a rubber roller. The sheets were then stoved in a gradient oven with a temperature gradient of from 180 to 220° C. and with a stoving time of 2 minutes. Immediately after the stoving process, the glass nonwoven was pulled away from the sheet and an assessment was made of the residual amount of adherent PVC.

Application Example 2

Thermoset/Curable Moulding Compounds—SMC Manufacture

The SMC formulations given in Table III, below were prepared by first homogenizing all of the liquid constituents, using a dissolver, and then mixing to incorporate all of the solids.

TABLE III

TEST SPECIFICATION ELECTRIC GREY - RAL 7032

| Application example | 2a* | 2b* | 2c | 2d* | 2e* | 2f* | 2g | 2h* |
|---|---|---|---|---|---|---|---|---|
| Resin 1 Palapreg P17-02 Standard glycol-phthalic-acid resin (35% strength in styrene) | 70.00 | 70.00 | 70.00 | 70.00 | 70.00 | 70.00 | 70.00 | 70.00 |
| Resin 2 Palapreg H 814-01 Polystyrene (33% strength in styrene) | 30.00 | 30.00 | 30.00 | 30.00 | 30.00 | 30.00 | 30.00 | 30.00 |
| Pigment paste in monomer-free polyester resin, Brohl Chemie, Electric grey RAL 7032-65 L (a.V.) | 10.00 | 10.00 | 10.00 | 10.00 | 10.00 | 10.00 | 10.00 | 10.00 |
| Tert-butyl peroxybenzoate Curing agent (Trigonox C from Akzo) | 1.50 | 1.50 | 1.50 | 1.50 | 1.50 | 1.50 | 1.50 | 1.50 |

TABLE III-continued

TEST SPECIFICATION ELECTRIC GREY - RAL 7032

| Application example | 2a* | 2b* | 2c | 2d* | 2e* | 2f* | 2g | 2h* |
|---|---|---|---|---|---|---|---|---|
| 2,6-Di-tert-butyl-4-methylphenol Inhibitor (Ionol CP) | 0.10 | 0.10 | 0.10 | 0.10 | 0.10 | 0.10 | 0.10 | 0.10 |
| Filler 1 Chalk (Millicarb OG) | 50.00 | 50.00 | 50.00 | 50.00 | 50.00 | 50.00 | 50.00 | 50.00 |
| Filler 2 Al(OH)$_3$ (Martinal ON 921) | 120.00 | 120.00 | 120.00 | 120.00 | 120.00 | 120.00 | 120.00 | 120.00 |
| PE powder Coathylene HA 1681 | 5.00 | 5.00 | 5.00 | 5.00 | 5.00 | 5.00 | 5.00 | 5.00 |
| Luvatol MK 35 NV (35% strength MgO in monomer-free UP resin) | 2.00 | 2.00 | 2.00 | 2.00 | 2.70 | 2.70 | 2.70 | 2.70 |
| Zn stearate* | 4.00 | | | | 4.00 | | | |
| C36 dimer acid (Pripol 1022 from Unichema)* | | 3.00 | | | | 3.00 | | |
| Preparation Example 7 | | | 3.00 | | | | 3.00 | |
| Preparation Example 9* | | | | 3.00 | | | | 3.00 |
| Thickening behaviour results: Viscosity [Pa · s] after | | | | | | | | |
| 3 days of storage | 120 000 | 70 000 | 110 000 | 120 000 | 150 000 | 75 000 | 150 000 | 150 000 |
| 5 days of storage | 150 000 | 80 000 | 140 000 | 150 000 | >160 000 | 100 000 | >160 000 | >160 000 |
| 8 days of storage | >160 000 | 90 000 | >160 000 | >160 000 | >160 000 | 105 000 | >160 000 | >160 000 |

*Comparative examples

To test thickening behaviour, a Brookfield viscometer was used (DVII, TF spindle at 0.5 rpm) to measure the viscosity of the compounding materials prepared as in the table above after storage at 20° C. Measurements 2a, 2c and 2d exhibited a thickening performance which was identical within the bounds of the usual technical variations, whereas formulation 2b prepared using the unesterified dicarboxylic acid exhibited marked impairment of thickening level.

The same results for formulations 2e–h, prepared using an increased amount of MgO. This means that even an increase in the content of MgO cannot compensate the adverse effect of the unesterified dicarboxylic acid (see comparative formulation 2f).

SMC prepregs were produced using formulations 2a–d on a Schmidt and Heinzmann experimental SMC plant, by applying the resin composition between two polyamide substrate films. (Belt speed: 5.5 m/min; doctor gap: 1.6 mm; weight per unit area: 4 000 g/m$^2$; glass grade used: OC RO7 4 800 tex from Owens Corning; glass content: 97 parts by weight, corresponding to 25% by weight, based on the entire formulation.)

For further processing after thickening was complete, the substrate films have to be capable of being peeled away entirely from the resin mats prior to the pressing procedure, and the prepregs themselves are to be as dry as possible and free from tack. Another assessment criterion used was the appearance of the peeled film which should be as transparent as possible and not have any adhesions of resin.

After storage for 5 days at room temperature, the thickened SMC prepregs were cut out to give pieces of 860 g, and the substrate film was peeled off, and its appearance evaluated.

TABLE IV

Assessment of handlability of prepregs prior to pressing procedure

| Formulation | Prepreg surface | Film appearance |
|---|---|---|
| 2a* | dry, slightly tacky | very opaque with considerable adhesions of compounded material |
| 2b* | very tacky | very opaque with considerable adhesions of compounded material |
| 2c | dry, not tacky | transparent, no adhesions of compounded material |

TABLE IV-continued

Assessment of handlability of prepregs prior to pressing procedure

| Formulation | Prepreg surface | Film appearance |
|---|---|---|
| 2d* | very tacky | milky, with marked adhesions of compounded material |

*Comparative examples

In inventive formulation 2c, particularly easy and tack-free removal of the substrate film was possible without cobwebbing.

Testing of Release Action, Colour Homogeneity and Surface Quality After the Moulding Process The SMC pieces freed from the substrate film were moulded to give test sheets, using 40% mould filling. The temperature used here was from 150 to 155° C., the moulding time was 180 s, and the ram pressure was 1 200 kN.

The finished moulded sheets were then visually assessed for colour homogeneity and surface quality.

To evaluate surface quality, the sheet to be tested was held slightly obliquely to the window, with a comparative sheet. The clarity with which the test surface could reflect objects was evaluated.

TABLE V

| Formulation | Assessment of demoulding | Colour homogeneity | Surface quality |
|---|---|---|---|
| 2a* | O.K. | poor, marked marbling | poor, matt |
| 2b* | O.K. | poor, marked marbling | slightly better than 2a |
| 2c | O.K. | slight marbling, best homogeneity | glossy |
| 2d* | poor, cracks in sheets | Assessment impossible, since marked surface disruption by matt effects/adhesions/cracks | |

*comparative examples

The test sheets produced using the comparative formulations 2a and 2b exhibited poor colour homogeneity, and the glass fibre structures which were clearly recognizable here caused marked marbling effects. In addition, the surface was matt. In contrast, the test sheets produced using inventive formulation 2c gave a visual impression which was overall markedly improved and resulted from a smoother, more glossy surface and better colour homogeneity, with markedly fewer marbling effects.

Test for Surface-Coatability

The SMC sheets were surface-coated using a commercially available 2-component automotive repair coating based on acrylic resin/isocyanate. Weight ratio of surface coating to curing agent=2:1. Mixing specification for surface coating:
Spies Hecker—Permacron surface coating for mixing, Series 257 AG201 white (=stock surface coating)
Spies Hecker—Permacron MS Härter plus 3040 kurz 2 parts by weight of stock surface coating: 1 part by weight of curing agent The SMC sheets were surface-coated, using a layer thickness (dry) of from 45 to 50 μm, and after air-drying they were stored at 80° C. for about 24 h. The sheets were then subjected to a cross-cut test to test adhesion. (Evaluation scale from Gt0 to Gt5: Gt0=good adhesion of surface coating, Gt5=poor adhesion of surface coating)

TABLE VI

Results of adhesion test

| Formulation | Cross-cut |
|---|---|
| 2a* | Gt5 |
| 2b* | Gt4 |
| 2c | Gt1 |
| 2d* | NOT TESTED |

*comparative examples

The test sheets produced using inventive formulation 2c exhibited substantially better adhesion of surface coating when compared with comparative formulations 2a and 2b. No testing of surface-coatability of the sheets of comparative formulation 2d could be carried out, since the surface quality was too poor, due to defective demoulding.

Application Example 3

The test mixing specification used was as in Application Example 2, but instead of electric grey RAL 7032 pigment paste, use was made of a cobalt blue pigment paste from FreiLacke, Emil Frei GmbH & Co. Lackfabrik, Durelastik Farbpaste, VP BÜ 1232.

Here again, easily the best surface quality and homogeneity was achieved when using the inventive formulation.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

The invention claimed is:

1. A polymer compositions comprising a synthetic polymer and a processing aid wherein the processing aid comprises esters of poly-carboxylic acids, or anhydrides thereof;
   wherein the poly-carboxylic acids are dimer or trimer acids having from 30 to 60 carbon atoms;
   wherein the acids or anhydrides are esterified with saturated aliphatic, unsaturated aliphatic, cycloaliphatic or aromatic mono-epoxides or mono-alcohols,
   wherein the epoxides and alcohols optionally contain ether groups;
   wherein from about 10% and to about 90% of the carboxyl groups of the acids have been esterified;
   wherein the synthetic polymer is a thermoplastic polymer or a thermoset polymer, the thermoplastic polymer is selected from the group consisting of polyvinyl chloride, polyvinylidene chloride, polyethylene, polypropylene, polyamide, polycarbonate, polystyrene, poly (meth) acrylate, polyester, ethylene-vinyl acetate copolymers, polyacrylonitrile, graft polymers of vinyl chloride and vinyl acetate, copolymers of vinyl chloride and vinyl acetate, and mixtures thereof; and the thermoset polymer is selected from the group consisting of an unsaturated polyester resin system, a polyurethane system, a curable (meth) acrylate resin system, or mixtures thereof.

2. The polymer composition of claim 1, wherein the alcohol is stearyl alcohol, oleyl alcohol, ethylhexyl glycidyl ether, isotridecyl alcohol, an oxo-alcohol polyethylene oxide ether of average molecular weight 400, methoxypolyethylene glycol of average molecular weight 350, methoxypolyethylene glycol of average molecular weight 500, methoxypolyethylene glycol of average molecular weight 750, butanoxypoly(ethylene oxide—propylene oxide 1:1) of average molecular weight 1,020, or mixtures thereof.

3. The polymer composition of claim 1, wherein the acid or anhydride is a hydrogenated C-36 dimer acid, a C-36 dimer acid, a C-54 trimer acid, or mixtures thereof.

4. The polymer composition of claim 1, wherein the partial esters have an acid value of at least 10 mg KOH/g.

5. A method for processing a polymer composition comprising incorporating a processing aid in the composition wherein the processing aid comprises esters of poly-carboxylic acids, or anhydrides thereof;
  wherein the poly-carboxylic acids are dimer or trimer acids having from 30 to 60 carbon atoms;
  wherein the acids or anhydrides are esterified with saturated aliphatic, unsaturated aliphatic, cycloaliphatic or aromatic mono-epoxides or mono-alcohols,
  wherein the epoxides and alcohols optionally contain ether groups;
  wherein from about 10% and to about 90% of the carboxyl groups of the acids have been esterified.

6. The method of claim 5, wherein the polymer composition comprises a thermoplastic polymer.

7. The method of claim 6, wherein the thermoplastic polymer is polyvinyl chloride, polyvinylidene chloride, polyethylene, polypropylene, polyamide, polycarbonate, polystyrene, poly (meth) acrylate, polyester, ethylene-vinyl acetate copolymers, polyacrylonitrile, graft polymers of vinyl chloride and vinyl acetate, copolymers of vinyl chloride and vinyl acetate, or mixtures thereof.

8. The method of claim 7, wherein polymer composition comprises plasticized PVC or PVC plastisol.

9. The method of claim 5, wherein the polymer composition comprises a thermoset polymer.

10. The method of claim 9, wherein the thermoset polymer is an unsaturated polyester resin system, a polyurethane system, a curable (meth) acrylate resin system, or mixtures thereof.

11. A method of making an unsaturated polyester resin system moulding composition according to the method of claim 9 wherein the thermoset polymer is an unsaturated polyester resin system.

12. A method of making a sheet moulding compounds, a bulk moulding compounds, a dough moulding compounds or a thick moulding compounds according to the method of claim 9 wherein the thermoset polymer is an unsaturated polyester resin system.

13. The method of claim 5, wherein the polymer composition is processed by injection molding, compression molding, extrusion, coating, casting, calandering, impregnation, foaming or pultrusion.

14. A polymer composition of claim 1 wherein the processing aid is present at from 0.05 to 10% by weight relative to the total weight of the polymer composition.

15. The polymer composition of claim 1, further comprising fillers, heat stabilizers, light stabilizers, antistats, flame retardants, reinforcing materials, pigments and/or dyes, processing auxiliaries, lubricants and release agents, impact modifiers, antioxidants, blowing agents or optical brighteners.

* * * * *